United States Patent [19]

Herden

[11] 4,340,877
[45] * Jul. 20, 1982

[54] HALL GENERATOR PRESSURE TRANSDUCER

[75] Inventor: Werner Herden, Stuttgart, Fed. Rep. of Germany

[73] Assignee: Robert Bosch GmbH, Stuttgart, Fed. Rep. of Germany

[*] Notice: The portion of the term of this patent subsequent to Mar. 3, 1998, has been disclaimed.

[21] Appl. No.: 200,764

[22] Filed: Oct. 27, 1980

[30] Foreign Application Priority Data

Nov. 17, 1979 [DE] Fed. Rep. of Germany ....... 2945515

[51] Int. Cl.³ .............................................. H01L 10/10
[52] U.S. Cl. .................................... 338/42; 338/32 H
[58] Field of Search ..................... 338/42, 41, 36, 195, 338/32 H, 32 R; 73/722, 728; 323/368

[56] References Cited

U.S. PATENT DOCUMENTS 3,761,958  9/1943  Nishira .............................. 338/42 X
4,156,820  5/1979  Fukuda et al. ................. 338/32 H X
4,218,626  8/1980  Fukuda et al. .................... 338/32 H
4,254,395  3/1981  Herden ................................. 338/42

Primary Examiner—C. L. Albritton
Attorney, Agent, or Firm—Frishauf, Holtz, Goodman & Woodward

[57] ABSTRACT

A corrugated membrane cavity has a flexible membrane, the center of which, in response to changes of pressure, varies of spacing between a magnet, for example carried on the membrane, and a Hall generator integrated circuit, in which the Hall generator is mounted coaxially with the polarity axis of the magnet and the flexible membrane. Another magnet on the other side of the Hall-IC faces the first magnet, so that like poles are facing each other, and so that the Hall-IC operates in a region of the induction field that is symmetrical with respect to the plane of zero induction that exists midway between the magnet. This working range makes possible a relatively high and linear variation of output voltge of the Hall-IC in response to variation of the magnetic induction which is particularly useful for pressure sensors for installation in the air intake duct of a motor vehicle engine.

7 Claims, 4 Drawing Figures

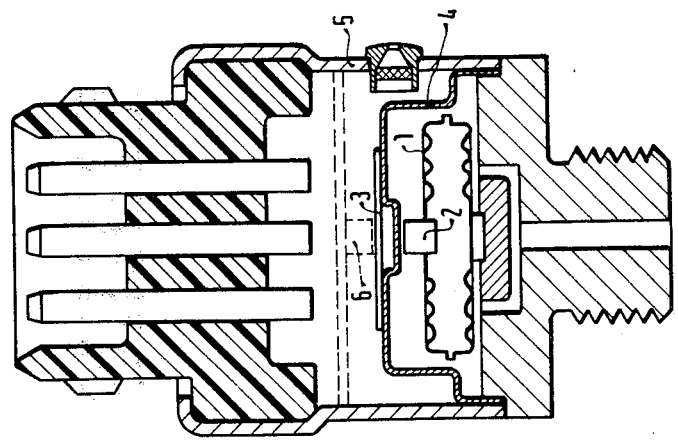
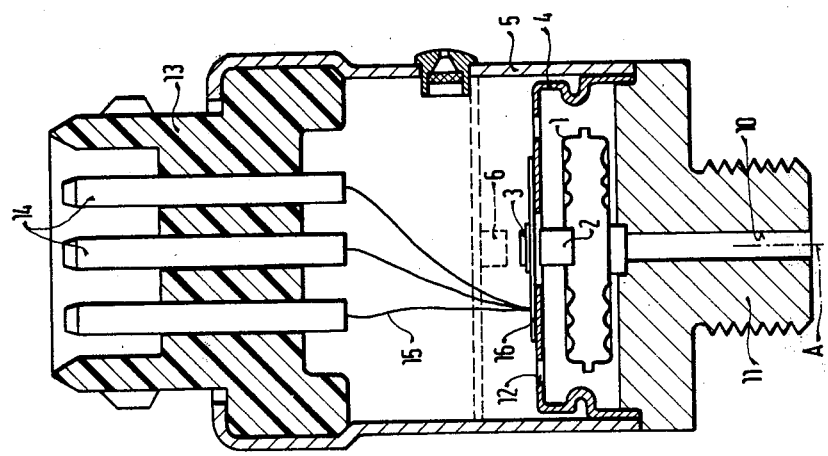

HALL GENERATOR PRESSURE TRANSDUCER

The invention concerns a pressure transducer for providing an electrical signal representative of a pressure sensed by the transducer by means of a Hall generator integrated circuit unit and a permanent magnet, the spacing between which is varied in response to pressure by a flexible membrane or aneroid capsule mounted so that its center moves axially in accordance with the pressure to which it is exposed. In particular, the invention concerns such a transducer in a form suitable for measuring the pressure in the air intake duct of an internal combustion engine. The membrane may conveniently be a wall of a cavity, either open or evacuated, and in the general shape of an aneroid element.

Two of my patent applications now pending are concerned with related subject matter, namely my application Ser. No. 107,274, filed Dec. 26, 1979 and my application Ser. No. 122,024, filed Feb. 19, 1980, the disclosures of which are hereby incorporated by reference. Previously known pressure transducers, for example those disclosed in German OS No. 16 73 938, have a permanent magnet provided in an iron magnetic path in which a semiconductor component operating as a Hall generator dependent upon the magnetic field is located, and also an air gap in which a regulated piece projects and modifies the lines of force in the air gap. Such converters, however, require very high precision in manufacture and in installation and, furthermore, have the disadvantage that they can be protected against interference from dirt and grime in operation in a motor vehicle only with substantial difficulty and expense.

THE INVENTION

It is an object of the present invention to provide a pressure sensor of simple construction and very compact configuration which is insensitive to the shaking stresses that arise in the operation of a motor vehicle.

The foregoing object is achieved by not only disposing the Hall generator of the integrated circuit and the permanent magnet on a common axis, but also so disposing the magnet and the Hall generator integrated circuit (hereinafter referred to simply as the Hall-IC) for variation of their relative spacing by the membrane or aneroid capsule that the Hall-IC exhibits a linear relation of its output voltage with respect to the magnetic induction over the range of relative spacing change produced by the membrane in response to pressure variation. It has been discovered that such a linear relation can be obtained over a usefully wide range of induction.

A particularly advantageous arrangement is provided by a further development of the invention in which the aneroid capsule membrane, as well as the permanent magnet and the Hall generator, are centered on the same axis, if the permanent magnet is constituted of a cobalt-rare earth compound, particularly of a cobalt-samarium compound, such as is disclosed in my said copending application Ser. No. 107,274, and particularly if a second permanent magnet, similarly constituted is provided coaxial with the Hall generator and the first permanent magnet with the two magnets having like poles facing each other across the space between them, in which space the Hall-IC is located, a configuration which is particularly favorable if the resultant movement of the Hall-IC and the field of induction values is such that the path of the Hall-IC through the field is symmetrical about the zero value of induction, which is to say that the path in the field extends from an induction value of $-B$ to an induction value of $+B$. In the preferred embodiment, the Hall-IC is stationary and the permanent magnet, or one of them if there are two, is mounted on the movable center of the membrane or aneroid capsule.

BRIEF DESCRIPTION OF THE DRAWINGS

The invention is further described by way of three different illustrative examples, with reference to the annexed drawings, in which:

FIGS. 1, 2 and 3 are axial sections respectively of three embodiments of the invention in a pressure transducer for mounting the air intake pipe of an internal combustion engine or sensing the pressure therein.

DESCRIPTION OF THE ILLUSTRATED EMBODIMENTS

Figure 3:
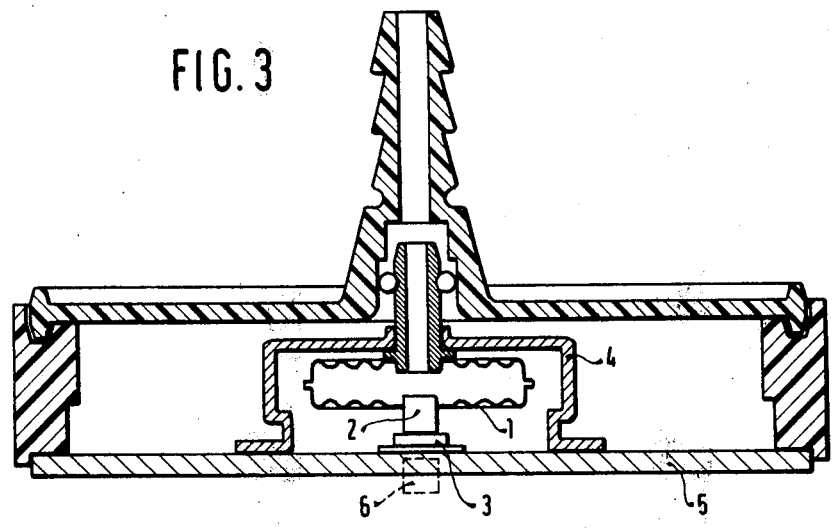

FIG. 1 shows, on a scale magnified by the factor of 2, a pressure transducer according to the invention having an expansible cavity 1 of the aneroid capsule type mounted so that its interior is connected to a longitudinal bore in a screw plug suitable for insertion in the wall of the air intake suction pipe of an internal combustion engine for subjecting the membrane cavity to the interior of the pipe. A permanent magnet 2 produced of $Co_5Sm$ is seated in the center of the movable aneroid capsule shown on the upper side of the cavity. The magnet 2 is polarized in the direction of the longitudinal axis A of the transducer, which is also the axis on which the capsule is centered. On this common axis A there is also disposed a Hall-IC 3, fixed to a carrier shell 4 with through apertures 12, the carrier shell 4 being firmly connected to the casing 5. At the free end of the casing 5 designed to extend outside the not shown intake pipe is a plug 13 having an upwardly open socket therein into which extend three connection prongs 14 embedded in the plug by injection molding. Each of the prongs 14 is connected by a wire lead 15 with an individual circuit component, not illustrated in the drawings, that is located on a ceramic wafer 16 carried by the shell 4. The Hall-IC 3 in the usual way includes not only a Hall generator, but also internal transistorized amplification means integrated into the Hall generator unit by a well-known integrated circuit technique (as is also made clear in the copending application of Werner Jundt et al., Ser. No. 177,133, filed Aug. 11, 1980 and owned by the Assignee of the present application). The hybrid circuits on the wafer 16 may be regarded as a practical matter as part of the Hall-IC although they are not strictly "integrated" with the Hall generator.

The magnetic induction affecting the Hall-IC falls off nearly hyperbolically more and more, the greater the spacing between the Hall-IC and the permanent magnet 2 becomes, for example as the result of falling pressure in the intake tube (not shown) in which the pressure transducer may be mounted.

Figure 4:
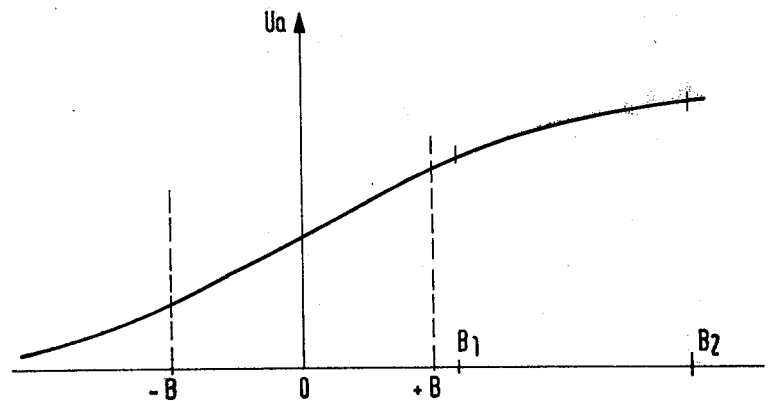
FIG. 4 is a graphical presentation of the relation between the output voltage $U_a$ of a Hall-IC in a pressure transducer according to the invention and the magnetic induction at the location of the Hall-IC.

FIG. 4 shows the relation between the output voltage $U_a$ of the Hall-IC 3 and the magnitude of the magnetic induction into which the Hall-IC reacts. In order to obtain enough sensitivity and therefore much greater output voltage span $U_a$, it is desired to locate the working range of the Hall-IC in such a way that it traverses the induction field symmetrically with respect to the location of zero value of induction, so that the working range lies between induction values of $-B$ and $+B$. This does not mean that the Hall-IC has to be movable, since motion of the movable magnet 2 causes the field that produces induction to move, so that the stationary Hall-IC 3 of FIG. 1 in effect traces a path through the moving field.

Placing the working region of the field for the Hall-IC between $-B$ and $+B$ is accomplished by providing a second permanent magnet 6 shown in broken lines in FIG. 1 in a position coaxial with the corregated membrane chamber 1, the first permanent magnet 2 and the Hall-IC 3. The two permanent magnets 2 and 6 face each other with like poles, which has the result that when there is equal magnetic force in the respective pole surfaces of the two magnets, the magnetic induction value B=zero occurs in the plane midway between the two magnets. If the second magnet 6 were not present, it would be necessary to locate the working range of the pressure transducer between the values $B_1$ and $B_2$ indicated in FIG. 4 on the relatively weakly rising curve portion of the characteristic, but by the use of the second permanent magnet 6, the working range is so shifted that it can lie at least approximately symmetrically with respect to the location where the induction B=0, i.e. working range will run from the induction value $-B$ to the value $+B$.

Although the pressure transducer shown in FIG. 1 represents a differential pressure version, the structure illustrated in FIG. 2 shows an embodiment in which the corrugated membrane cavity is evacuated so that the system accordingly measures absolute pressure. In FIG. 2, the same reference numerals used in FIG. 1 are used to designate identical or identically functioning parts.

FIG. 3 shows an embodiment for fitting the pressure transducer into a circuit unit, so that the pressure transducer can be calibrated in the circuit unit. There is shown in this case an adjustable bracket or pot 4 by means of which the pressure transducer can be set at a particular operating point, either by pressing on the bracket or by screwing a fine screw-thread (not shown) of the transducer. By setting the operating point, the system can be calibrated so that a desired output voltage is obtained for a particular pressure condition.

It is envisaged in the above-described illustrated embodiment, that resistances should be provided on the hybrid circuit plate 16 of the integrated circuit, spaced laterally from the semiconductor chip of the integrated circuit which is responsive to the magnetic field and that these resistors can be trimmed for calibration purposes by means of a laser beam in a known way.

The particular advantages of the pressure transducer of the present invention are that, first, it is highly economical to manufacture, second, that it requires only a small displacement of the movable magnet, third, that it has a space saving construction, and fourth and above all, that it is insensitive to the shaking stresses arising in operation in a motor vehicle. Furthermore, a simple lasting initial adjustment can be performed and a high analog voltage output signal is reliably provided. The pressure ranges can easily be changed by interchanging the flexible membrane cavities, especially since the arrangement is insensitive with respect to axial tolerances.

Although the invention has been described with respect to particular preferred embodiments, it will be understood that further modifications and variations are possible within the inventive concept, for example, it is not necessary that a movable magnet be mounted on the membrane and instead the Hall-IC could be located there, in which case, however, it would be necessary to put one of the two magnets, when two are used, to obtain the greatest advantages of the invention, on the other side of the membrane, which might mean it would have to be inside the membrane cavity.

Of course in centering the Hall-IC 3 on the common axis A, it the Hall generator portion of the IC that has an axis that must be aligned with the axes of the magnet and of the membrane or membrane cavity.

I claim:

1. A pressure transducer producing an electrical signal representing pressure and capable of service in the intake air duct of an internal combustion engine, comprising a membrane or aneroid capsule constituted and held so that its center moves in dependence upon pressure applied thereto, a permanent magnet and a Hall generator provided in an integrated circuit so disposed that the movement of the center of said membrane varies the spacing between said permanent magnet and said Hall generator integrated circuit and, further, comprising the improvement that consists in that:

said Hall generator and said permanent magnet (2) are coaxially disposed; and the Hall generator integrated circuit (3) exhibits linear relation between its output voltage ($U_a$) and the magnetic induction (B) to which it is subject over a range of variation of said spacing between said Hall generator and said permanent magnet, produced by movement of said membrane center.

2. A pressure transducer as defined in claim 1 in which said Hall generator, said permanent magnet (2) and said membrane are centered on a common axis (A) and in which said membrane or aneroid capsule form one or two flexible walls of a chamber (1).

3. A pressure transducer as defined in claim 2 in which said permanent magnet consists of a compound of cobalt and a rare earth element.

4. A pressure transducer as defined in claim 3 in which said permanent magnet consists of a cobalt samarium compound.

5. A pressure transducer as defined in claim 1 in which said Hall generator integrated circuit (3) is stationary and said permanent magnet (2) is seated on said membrane (1).

6. A pressure transducer as defined in claim 5 in which a second permanent magnet (6) is provided and disposed coaxially with said Hall-IC and said first permanent magnet (2) and said magnets face each other with poles of the same magnetic polarity.

7. A pressure transducer as defined in any one of claims 1–6 in which a ceramic carrier wafer (12) is provided laterally outwards of said hall generator integrated circuit with respect to said axis and there are provided on said wafer at least two trimmable resistances connected in circuit with said Hall generator integrated circuit for facilitating calibration of the transducer.

* * * * *

UNITED STATES PATENT AND TRADEMARK OFFICE
CERTIFICATE OF CORRECTION

PATENT NO. : 4,340,877
DATED : July 20, 1982
INVENTOR(S) : Werner HERDEN

It is certified that error appears in the above—identified patent and that said Letters Patent is hereby corrected as shown below:

On the first page of the patent, the number of the foreign application should be changed from "2945515" to

-- 2946515 --.

Signed and Sealed this

Thirtieth Day of November 1982

[SEAL]

Attest:

GERALD J. MOSSINGHOFF

*Attesting Officer*     *Commissioner of Patents and Trademarks*